(12) United States Patent
Kawamoto et al.

(10) Patent No.: US 8,596,488 B2
(45) Date of Patent: Dec. 3, 2013

(54) TANK FOR CONSTRUCTION MACHINE

(75) Inventors: Kenji Kawamoto, Hiroshima (JP); Chikara Ninomiya, Hiroshima (JP)

(73) Assignee: Kobelco Construction Machinery Co., Ltd., Hiroshima-shi (JP)

( * ) Notice: Subject to any disclaimer, the term of this patent is extended or adjusted under 35 U.S.C. 154(b) by 0 days.

(21) Appl. No.: 13/611,785

(22) Filed: Sep. 12, 2012

(65) Prior Publication Data

US 2013/0082062 A1 Apr. 4, 2013

(30) Foreign Application Priority Data

Sep. 30, 2011 (JP) ................. 2011-216498

(51) Int. Cl.
*B65D 1/42* (2006.01)
*B65D 6/34* (2006.01)

(52) U.S. Cl.
USPC ............................ 220/563; 220/646; 220/562

(58) Field of Classification Search
USPC .................. 220/646, 563, 562, 653
See application file for complete search history.

(56) References Cited

U.S. PATENT DOCUMENTS

| | | | | |
|---|---|---|---|---|
| 1,757,923 | A * | 5/1930 | Russell ........................ | 220/653 |
| 3,739,556 | A * | 6/1973 | Waters .......................... | 96/356 |
| 5,647,503 | A * | 7/1997 | Steele et al. ................. | 220/589 |
| 6,135,306 | A * | 10/2000 | Clayton et al. ............... | 220/564 |
| 6,138,859 | A * | 10/2000 | Aulph et al. ................. | 220/563 |
| 6,338,420 | B1 * | 1/2002 | Pachciarz et al. ............ | 220/562 |
| 7,380,626 | B2 * | 6/2008 | Chikaishi et al. .......... | 180/89.13 |
| 7,427,000 | B2 * | 9/2008 | Austerhoff et al. .......... | 220/4.14 |
| 7,455,190 | B2 * | 11/2008 | Potter et al. ................. | 220/4.14 |
| 7,568,592 | B2 * | 8/2009 | Miyauchi et al. ............ | 220/562 |
| 2006/0102634 | A1 * | 5/2006 | Potter et al. ................. | 220/562 |
| 2012/0325822 | A1 * | 12/2012 | Pozgainer ..................... | 220/562 |

FOREIGN PATENT DOCUMENTS

| | | |
|---|---|---|
| JP | 2004-189128 | 7/2004 |
| JP | 2008-265531 A | 11/2008 |
| JP | 2008-265532 A | 11/2008 |
| JP | 2010-70165 | 4/2010 |

OTHER PUBLICATIONS

Extended European Search Report issued Jan. 30, 2013 in Patent Application No. 12184856.8.

* cited by examiner

*Primary Examiner* — Mickey Yu
*Assistant Examiner* — Niki Eloshway
(74) *Attorney, Agent, or Firm* — Oblon, Spivak, McClelland, Maier & Neustadt, L.L.P.

(57) ABSTRACT

Provided is a tank comprising a tank body and first and second reinforcement members. The tank body includes a first wall portion, a first opposing wall portion opposing to the first wall portion in a first direction, a second wall, and a second opposing wall portion opposing to the second wall in a second direction. The first reinforcement member is disposed across the first wall portion and the first opposing wall portion, the first reinforcement member having opposite ends welded to the first wall portion and the first opposing wall portion, respectively. The second reinforcement member is disposed across the second wall and the second opposing wall portion while spatially crossing the first reinforcement member, the second reinforcement member having opposite ends welded to the second wall and the second opposing wall portion, respectively.

8 Claims, 9 Drawing Sheets

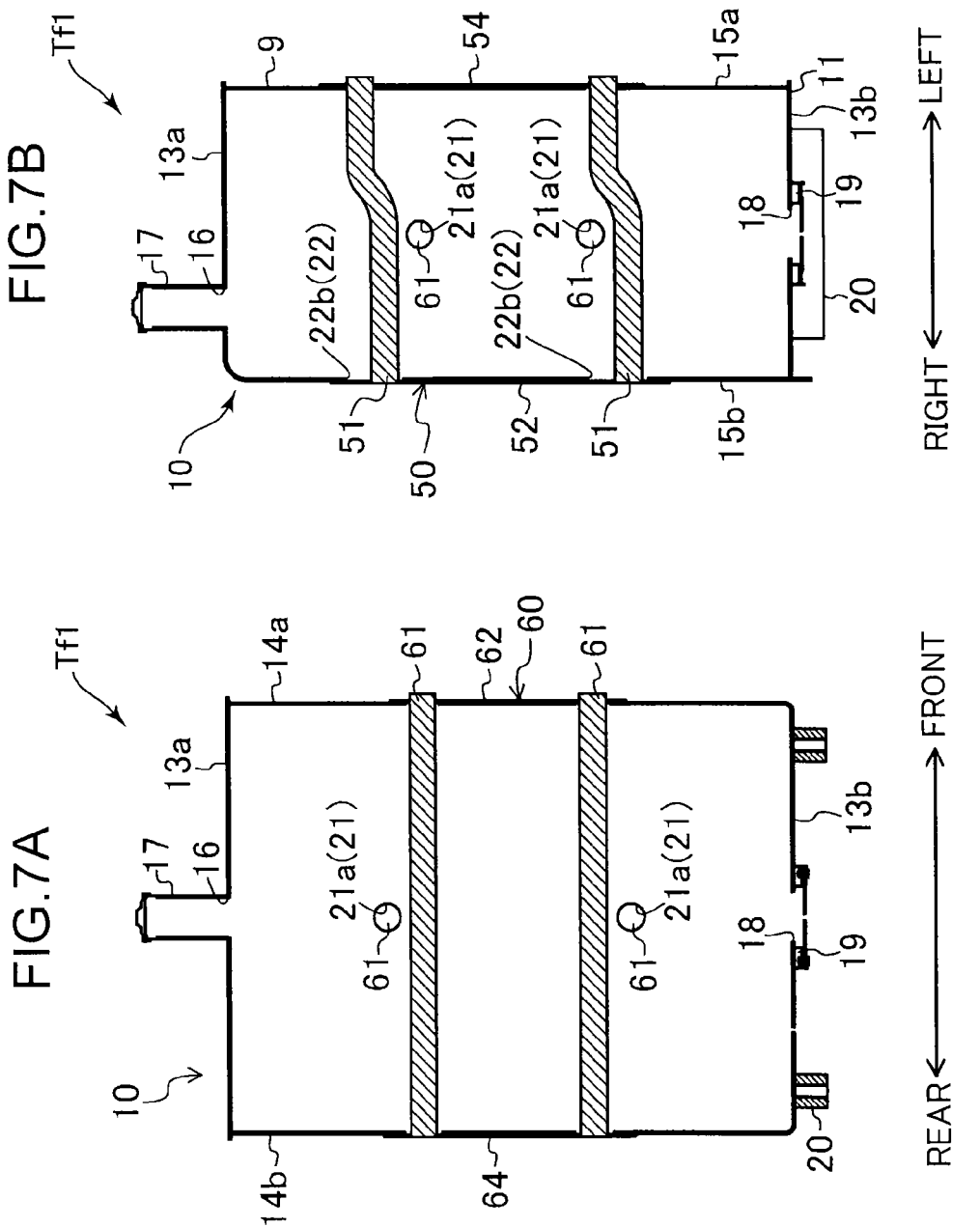

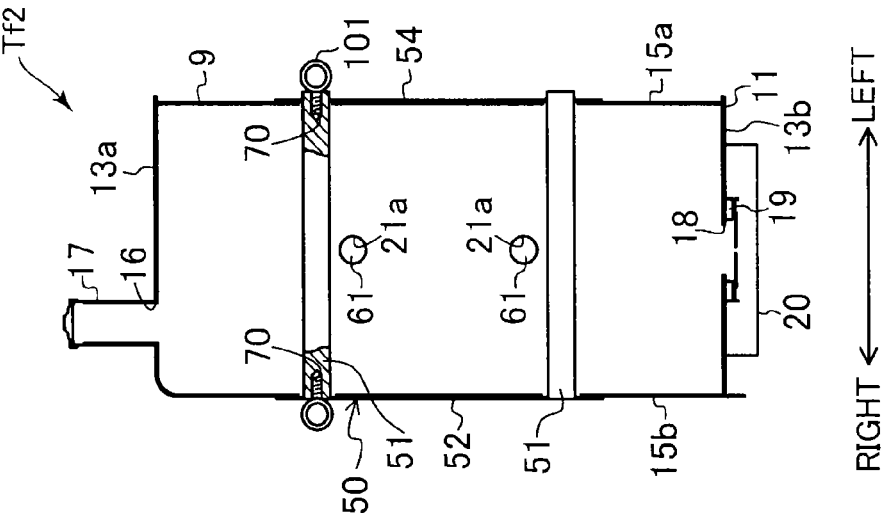
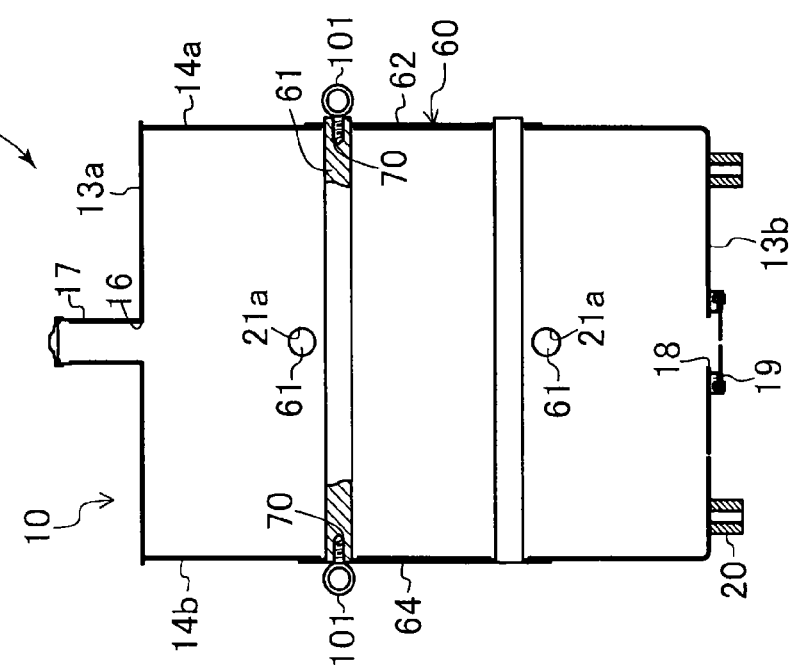

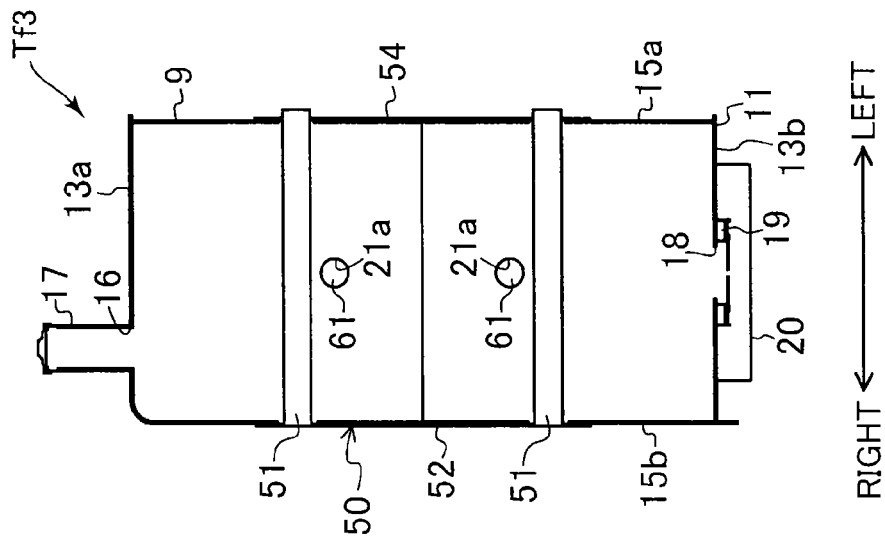
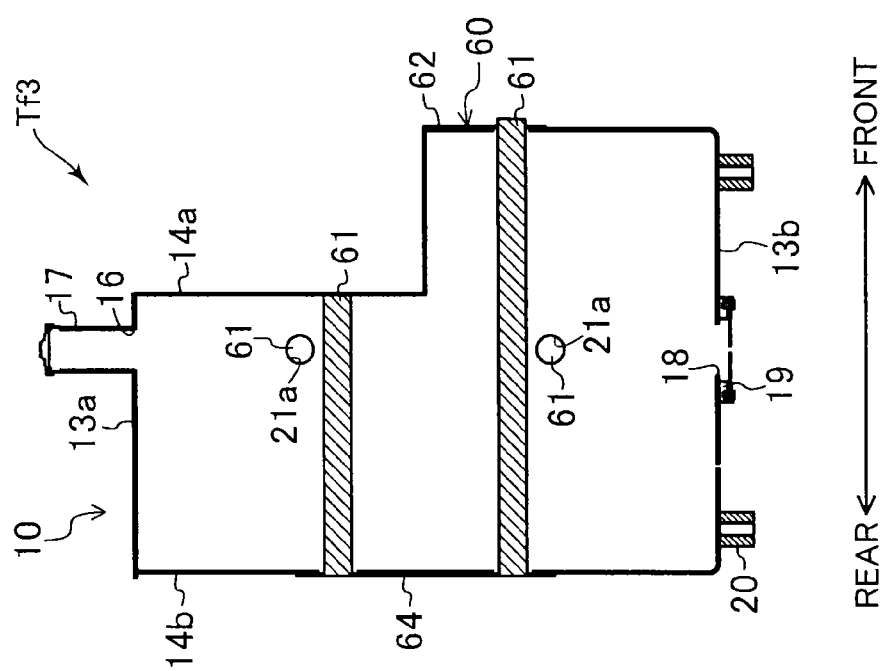
FIG.9A
FIG.9B

TANK FOR CONSTRUCTION MACHINE

BACKGROUND OF THE INVENTION

1. Field of the Invention

The present invention relates to a tank to be provided in a construction machine.

2. Description of the Background Art

There is conventionally known a fuel tank formed of a plurality of metal plates into a box shape, for example, as described in JP 2010-70165A. Each of the metal plates is suitably bent, and the metal plates are combined and welded to each other.

This type of a fuel tank is often additionally provided with a reinforcement member to enhance strength of the tank. For example, JP 2004-189128A discloses a fuel tank having right and left side wall plates each having an inner surface and a metal-formed channel member, as a reinforcement member, welded to the inner surfaces to enhance rigidity of both of the side wall plates.

In this type of a tank, there is required welding the channel member as the reinforcement member over the longitudinally full range thereof, which generates a heat involving an increase in residual stress and welding distortion. Besides, there may occur further problems such as reduction in internal cleanness of the tank due to welding residues adhered to the inner surface of the tank, long-time welding operation, increase in the number of steps for assembling the tank, deterioration of an appearance of the tank due to embossment of welding marks remained in the side wall surface to an outer surface of the side wall, and low reinforcement effect compared with mass of the used reinforcement member.

SUMMARY OF THE INVENTION

It is an object of the present invention to provide a tank to be provided in a construction machine, the tank having enhanced rigidity with a low-cost structure and an excellent assembly performance without remarked reduction in internal cleanness. The provided tank comprises a tank body, at least one first reinforcement member, and at least one second reinforcement member. The tank body includes a first wall portion, a first opposing wall portion opposing to the first wall portion in a first direction, a second wall portion lying between the first wall portion and the first opposing wall portion, and a second opposing wall portion lying between the first wall portion and the first opposing wall portion and opposing to the second wall portion in a second direction crossing the first direction. The at least one first reinforcement member is disposed across the first wall portion and the first opposing wall portion and has opposite ends welded to the first wall portion and the first opposing wall portion, respectively. The at least one second reinforcement member is disposed across the second wall portion and the second opposing wall portion while spatially crossing the at least one first reinforcement member, that is, crossing the at least one first reinforcement member with a distance in a direction perpendicular to either of the first and second directions, and has opposite ends welded to the second wall portion and the second opposing wall portion, respectively.

BRIEF DESCRIPTION OF THE DRAWINGS

FIG. 7A is a schematic diagram illustrating a first modified embodiment, wherein it is represented by a cross-section corresponding to FIG. 6, and FIG. 7B is a schematic diagram illustrating the first modified embodiment, wherein it is represented by a cross-section corresponding to FIG. 5.

FIG. 8A is a schematic diagram illustrating a second modified embodiment, wherein it is represented by a cross-section corresponding to FIG. 6, and FIG. 8B is a schematic diagram illustrating the second modified embodiment, wherein it is represented by a cross-section corresponding to FIG. 5.

FIG. 9A is a schematic diagram illustrating a third modified embodiment, wherein it is represented by a cross-section corresponding to FIG. 6, and FIG. 9B is a schematic diagram illustrating the third modified embodiment, wherein it is represented by a cross-section corresponding to FIG. 5.

DESCRIPTION OF THE PREFERRED EMBODIMENTS

There will be described below an embodiment according to the present invention with reference to the drawings.

Figure 1:
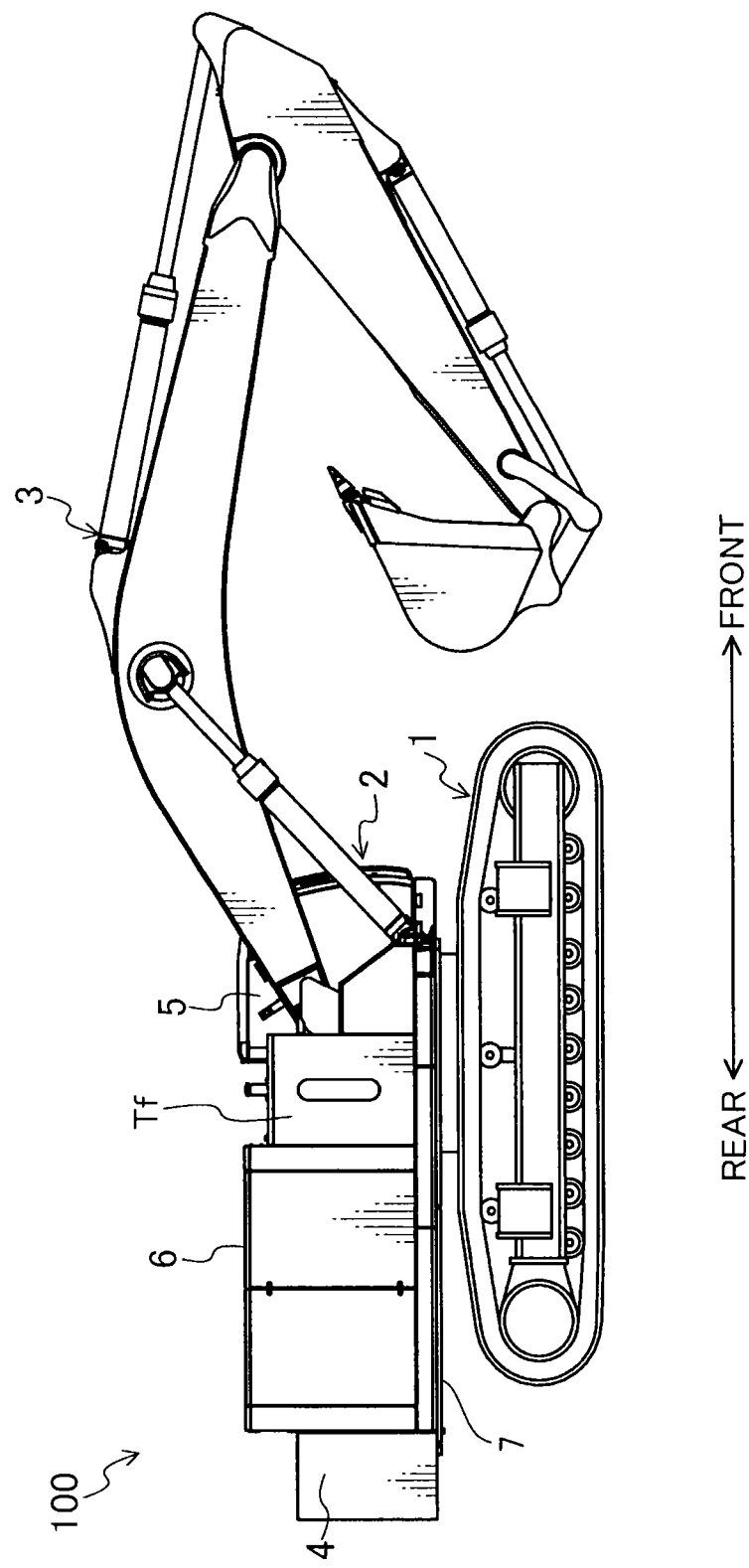
FIG. 1 is a right side view of a hydraulic shovel which is one example of a construction machine equipped with a fuel tank according to one embodiment of the present invention.
Figure 2:
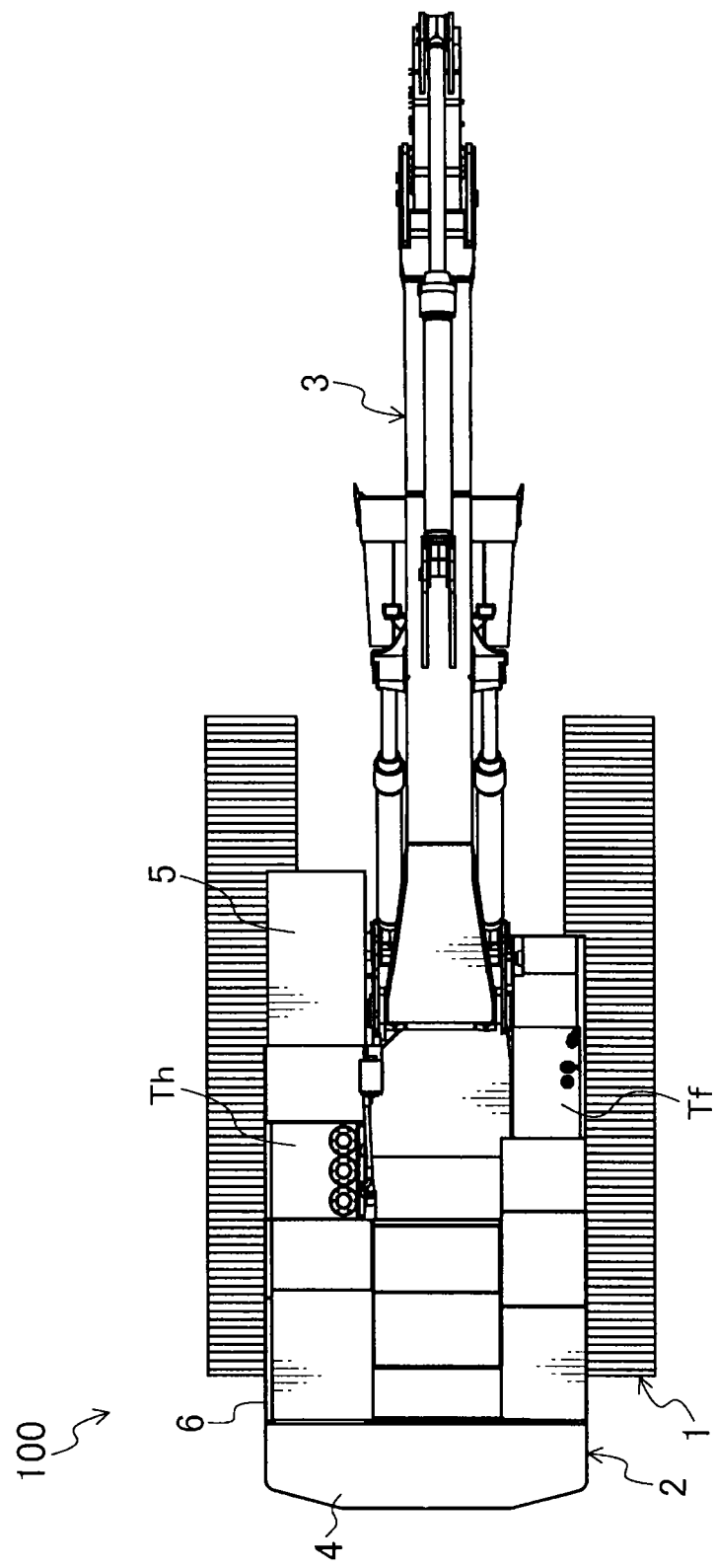
FIG. 2 is a top plan view of the hydraulic shovel.

FIGS. 1 and 2 show a fuel tank Tf which is a tank according to the embodiment of the present invention and a hydraulic excavator 100 as an example of construction machines on which the fuel tank is mountable.

The hydraulic excavator 100 includes a crawl type of an lower propelling body 1, an upper slewing body 2 slewably supported on the lower propelling body 1, and an operation implement 3 attached to a front end of the upper slewing body 2 in a raisable and lowerable manner to perform excavation working or the like. In the following description, "front side", "rear side", "right side", and "left side" mean respective ones from a view of an operation seat of the hydraulic excavator 100 in such an attitude that the operation implement 3 directs to a front side.

The upper slewing body 2 includes an upper frame 7, a cab 5 provided on a left-front section of the upper frame 7 to define an operating room, a counter weight 4 provided on a rear-end portion of the upper frame 7, a machine room 6 located at the front side of the counter weight 4 and accommodating an engine, a hydraulic pump for driving the engine, and the like, a hydraulic fluid tank Th disposed at the left-front side of the machine room 6 so as to be interposed between the cab 5 and the machine room 6, the hydraulic fluid tank Th storing hydraulic fluid to be pressurized and supplied to each of the actuators by the hydraulic pump. The fuel tank Tf, which is for storing fuel to be supplied to the engine, is provided at the right-front side of the machine room 6.

Figure 3:
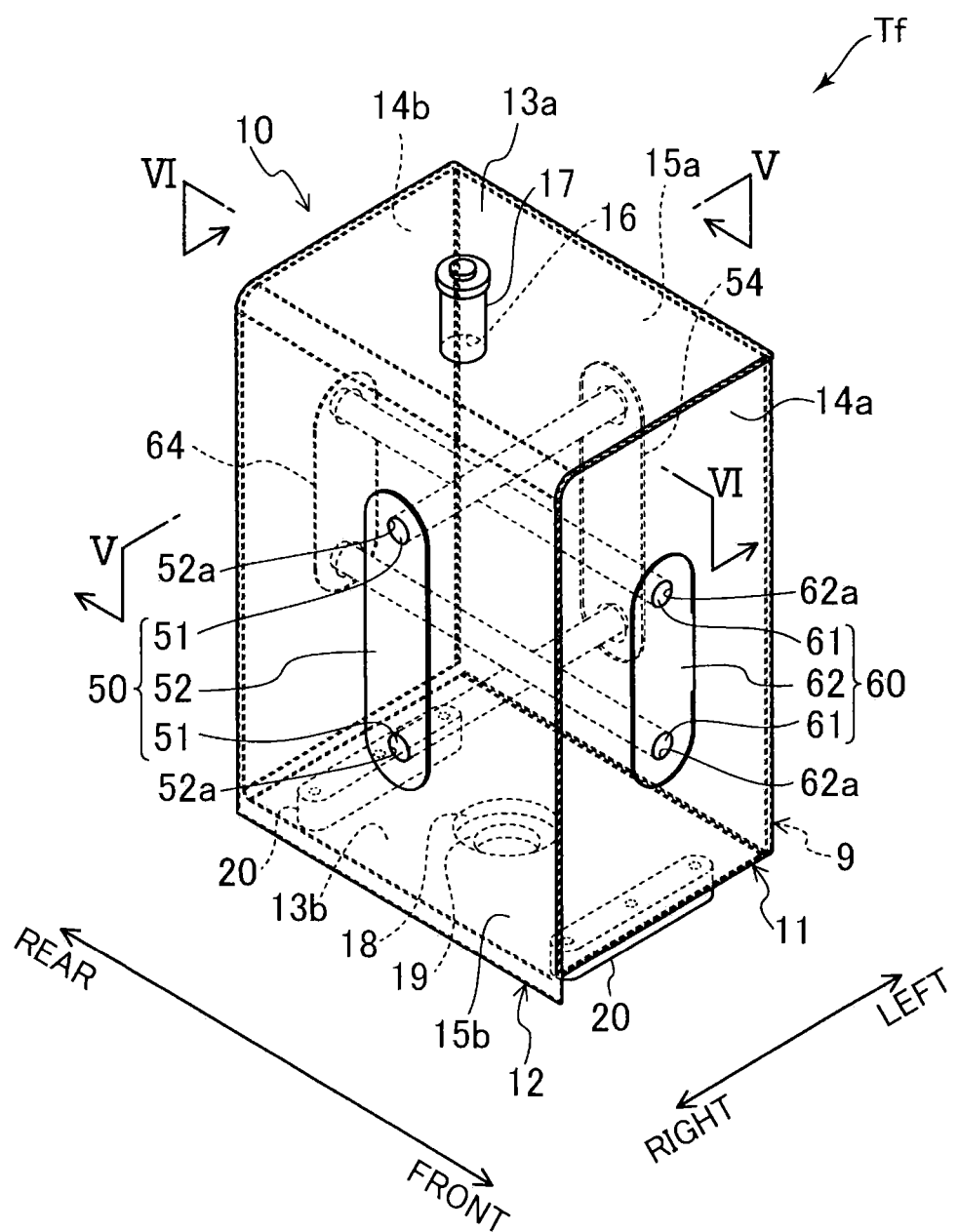
FIG. 3 is a perspective view of the fuel tank, when viewed obliquely rearwardly from a right front side of the hydraulic shovel.
Figure 4:
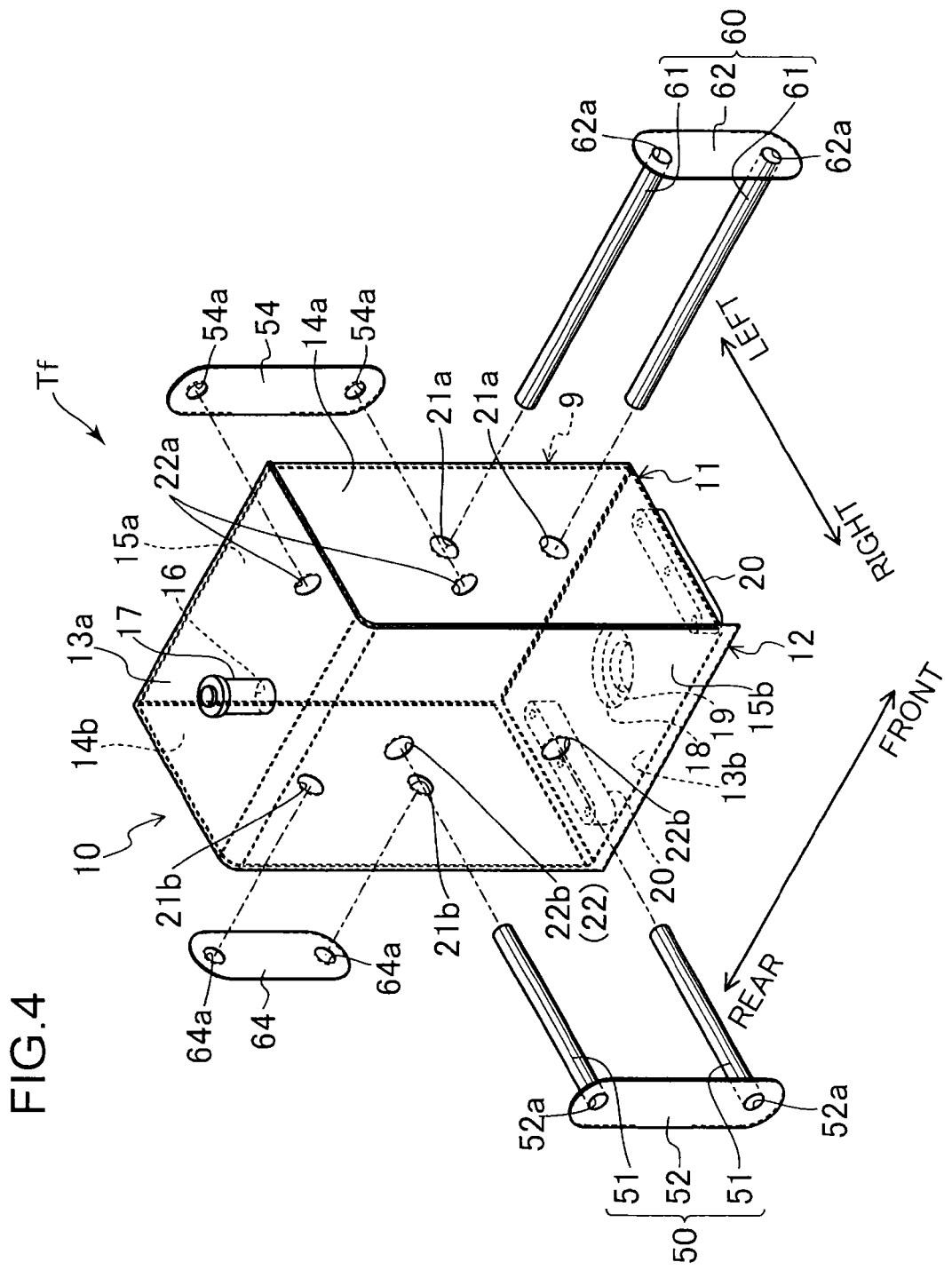
FIG. 4 is an exploded perspective view of the fuel tank.

As shown in FIGS. 3 and 4, the fuel tank Tf, which will be simply called "tank Tf" below, has a tank body 10 formed into a hollow box shape extending vertically and in a front-rear direction, a first reinforcement assembly 50 for reinforcing the tank Tf mainly in a right-left direction, and a second reinforcement assembly 60 for reinforcing the tank Tf mainly in the front-rear direction.

The tank body 10 in this embodiment includes a plurality of metal plates, for example, steel plates. Specifically, the tank body 10 is based on a combination of a first plate 9 formed of a flat plate, a second plate 11 formed of a plate bended so as to have a channel-shaped cross section, and a third plate 12 formed of a plate bended in an entire L-shape, these plates being welded to each other.

The tank body 10 is shaped into, in this embodiment, a rectangular having an upper wall portion 13a and a lower wall portion 13b opposing to each other in a vertical direction, a front wall portion 14a and a rear wall portion 14b opposing to each other in a front-rear direction that is a second direction according to the invention, and a right wall portion 15b and a left wall portion 15a which are opposing to each other in the right-left direction, that is, a first direction crossing the second direction. The right wall portion 15b, the left wall portion 15a, the front wall portion 14a and the rear wall portion 14b in the tank body 10 correspond to a first wall portion, a first opposing wall portion opposing to the first wall portion in the first direction, a second wall portion lying between the first wall portion and the first opposing wall portion, and a second opposing wall portion lying between the first wall portion and the first opposing wall portion and opposing to the second wall in the second direction, respectively.

The top wall portion 13a is formed with a filler hole 16, around which there is provided a cylindrical-shaped filler pipe 17 standing upwardly. The bottom wall portion 13b of the tank body 10 has a cleaning hole 18 formed in a central region thereof for internal cleaning operation of the tank body 10, and around the cleaning hole 18 is formed a thick-walled ring-shaped flange 19 to which a cap is to be attached. The bottom wall portion 13b of the tank body
has a lower surface, to which a pair of base members 20 are welded so as to be arranged side-by-side in the front-rear direction.

As shown in FIG. 4, the front wall portion 14a and the rear wall portion 14b of the tank body 10 are formed with a plurality of fixing holes 21a and a plurality of fixing holes 21b, respectively, which are second fixing holes for fixing the second reinforcement assembly 60 to the tank body 10. The fixing holes 21a are provided at respective two positions vertically aligned in the front wall portion 14a, and the fixing holes 21b are provided at respective two positions vertically aligned in the rear wall portion 14b. The upper fixing holes 21a and 21b are provided at the same height position, and similarly, the lower fixing holes 21a and 21b are provided at the same height position.

Likewise, as shown in FIG. 4, the left wall portion 15a and the right wall portion 15b of the tank body 10 are formed with a plurality of fixing holes 22a and a plurality of fixing holes 22b, respectively, which are first fixing holes for fixing the first reinforcement assembly 50 to the tank body 10. The fixing holes 22a are provided at respective two positions vertically aligned in the left wall portion 15a, and the fixing holes 22b are provided at respective two positions vertically aligned in the right wall portion 15b. The upper fixing holes 22a and 22b are provided at the same vertical position. Similarly, the lower fixing holes 22a and 22b are provided at the same vertical position.

Each of the front wall portion 14a and the rear wall portion 14b has a height equal to that of each of the left wall portion 15a and the right wall portion 15b, while each of the left and right wall portions 15a and 15b has a greater width than that of each of the front and rear wall portions 14a and 14b. Each of the left and right wall portions 15a and 15b, therefore, has an inner surface of an area greater than that of an inner surface of each of the front and rear wall portions 15a and 15b, so that each of the left and right wall portions 15a and 15b undergoes a greater load due to a fuel pressure in the tank body 10 than that of a load which each of the front and rear wall portions 14a and 14b undergoes.

Next will be described respective details of the first and second reinforcement assemblies 50 and 60.

As shown in FIGS. 3 and 4, the first reinforcement assembly 50 comprises a vertically extending attachment plate 52, which is a first attachment plate, and a plurality of (in this embodiment, a pair of upper and lower) rod-shaped first reinforcement members 51 joined to the attachment plate 52 so as to extend from respective upper and lower ends of the attachment plate 52 in the same horizontal direction (right-left direction), being disposed across the right wall portion 15b and the left wall portion 15a. In this embodiment, each of the first reinforcement members 51 is composed of a round bar having a circular cross-section. The first reinforcement members 51 are arranged parallel to each other with a vertical distance. The attachment plate 52 is fixed to respective basal ends of the upper and lower first reinforcement members 51 in a flange shape extending across the basal ends, that is, so as to protrude outward from the entire circumference of each of the basal ends. The attachment plate 52 is formed with a pair of through-holes 52a in respective upper and lower ends thereof, and the basal ends of the first reinforcement members 51 are welded to the attachment plate 52 while being fitted into the through-holes 52a respectively. The basal ends of both of the first reinforcement members 51 are thus interconnected through the attachment plate 52.

The first reinforcement members 51 can be inserted through a pair of right fixing holes 22b formed in the right wall portion 15b, respectively, from outside of the tank Tf. With this insertion, the attachment plate 52 joined to the basal ends of the first reinforcement members 51 is welded to an outer surface of the right wall portion 15b, and a distal end of each of the first reinforcement members 51 is joined to the left wall portion 15a opposing to the right wall portion 15b. The first reinforcement assembly 50 is thus fixed to the tank body 10 so that each of the first reinforcement members 51 extends in the first direction, in this embodiment, the right-left direction.

Figure 5:
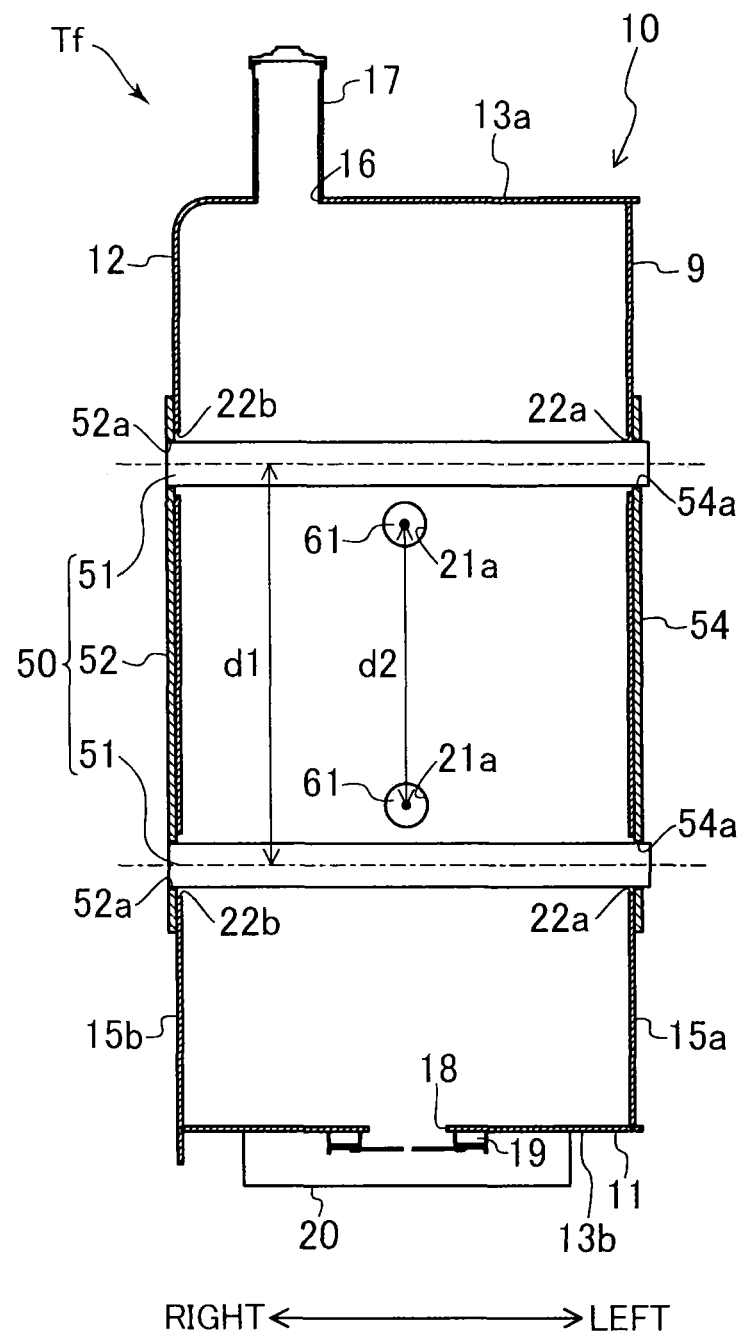
FIG. 5 is a sectional view taken along the line V-V in FIG. 3.

The distal ends of the first reinforcement members 51 are preferably joined to the left wall portion 15a through an opposing plate 54, which is a first opposing plate. The opposing plate 54 is composed of a vertically extending metal plate, as with the attachment plate 52, and disposed, across the fixing holes 22a of the left wall portion 15a, so as to be parallel to the attachment plate 52 and oppose to the attachment plate 52 in the right-left direction. The opposing plate 54 is formed with a pair of through-holes 54a in vertical opposite ends thereof, respectively, at respective positions corresponding to the left fixing holes 22a of the left wall portion 15a. Each of the through-holes 54a is formed in axial alignment with each of the left fixing holes 22a. As shown in FIG. 5, each of the first reinforcement members 51 has such a length that the distal end of the first reinforcement member 51 slightly protrudes outside the tank Tf beyond an outer surface of the opposing plate 54 when the first reinforcement member 51 penetrates through the left fixing hole 22a of the left wall portion 15a and the through-hole 54a of the opposing plate 54, and an outer peripheral surface of the protruding distal end is welded to a region around the through-hole 54a of the opposing plate 54. In short, the distal ends of the first reinforcement members 51 can be joined to the left wall portion 15a through the opposing plate 54. The opposing plate 54 can be composed of a metal plate having the same shape as that of the metal plate making up the attachment plate 52. This enhances mass-productivity of both of the opposing plate 54 and the attachment plate 52, thereby permitting cost to be reduced.

As shown in FIGS. 3 and 4, the second reinforcement assembly 60, similarly to the first reinforcement assembly 50, comprises a vertically extending attachment plate 62, which is a second attachment plate, and a plurality of (in this embodiment, a pair of upper and lower) second reinforcement members 61 joined to the attachment plate 62 so as to extend from respective upper and lower ends of the attachment plate 62 in the same horizontal direction, namely, front-rear direction, being disposed across the front wall portion 14a and the rear wall portion 14b. In this embodiment, each of the second reinforcement members 61 is composed of a round bar having a circular cross-section. The second reinforcement members 61 are arranged parallel to each other with a vertical distance. The attachment plate 62 is provided across respective basal ends of the upper and lower second reinforcement members 61 in a flange shape. The attachment plate 62 is formed with a pair of through-holes 62a in respective upper and lower ends thereof, and each of the basal ends of the second reinforcement members 61 is welded to the attachment plate 62 while fitted into the through-holes 62a respectively. The basal ends of both of the second reinforcement members 61 are thus interconnected through the attachment plate 62.

The second reinforcement members 61 can be inserted through the front fixing holes 21a formed in the front wall portion 14a (see FIG. 4), respectively, from outside of the tank Tf. With this insertion, the attachment plate 62 joined to the basal ends of the second reinforcement members 61 is welded to an outer surface of the front wall portion 14a, and a distal end of each of the second reinforcement members 61 is joined to the rear wall portion 14b opposing to the front wall portion 14a. The second reinforcement assembly 60 is thus fixed to the tank body 10 so that each of the second reinforcement members 61 extends in the second direction, in this embodiment, in the front-rear direction.

Figure 6:
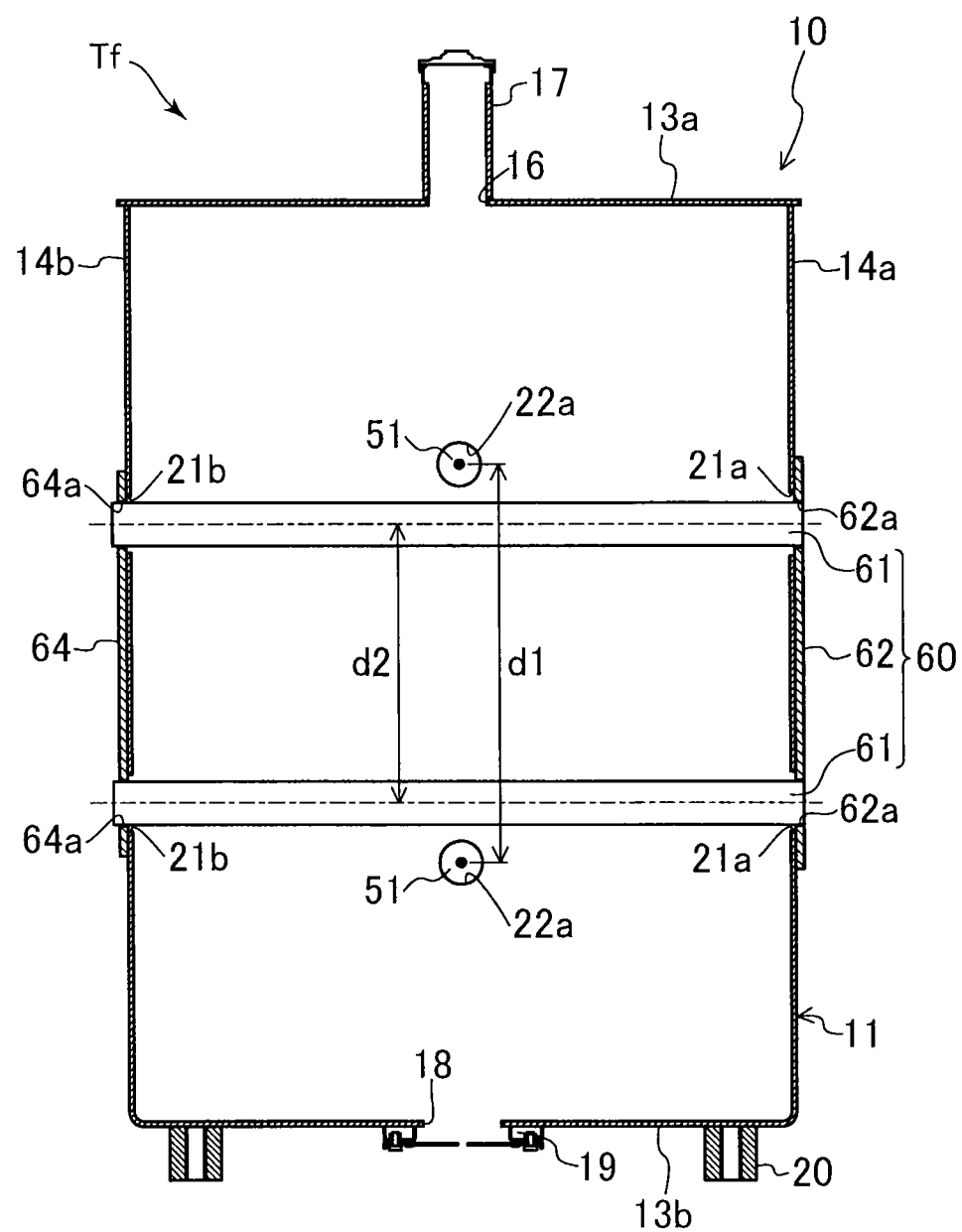
FIG. 6 is a sectional view taken along the line VI-VI in FIG. 3.

The distal ends of the second reinforcement members 61 are preferably joined to the rear wall portion 14b through an opposing plate 64, similarly to the first reinforcement members 51. The opposing plate 64, which is a second opposing plate, is composed of a vertically extending metal plate, as with the attachment plate 62, and disposed so as to be parallel to the attachment plate 62 and oppose to the attachment plate 62 in the right-left direction, across the fixing holes 21b of the rear wall portion 14b. The opposing plate 64 is formed with a pair of through-holes 64a in vertical opposite ends thereof, respectively, at respective positions corresponding to the fixing holes 21b of the rear wall portion 14b. Each of the through-holes 64a is formed in axial alignment with each of the fixing holes 21b. As shown in FIG. 6, each of the second reinforcement members 61 has such a length that the distal end of the second reinforcement member 61 slightly protrudes outside the tank Tf beyond an outer surface of the opposing plate 64 when the second reinforcement member 61 penetrates through the rear fixing hole 21b of the rear wall portion 14b and the through-hole 64a of the opposing plate 64, and an outer peripheral surface of the protruding distal end is welded to a region around the through-hole 64a of the opposing plate 64. In short, the distal ends of the second reinforcement members 61 can be joined to the rear wall portion 14b through the opposing plate 64. The opposing plate 64 can be composed of a metal plate having the same shape as that of the metal plate making up the attachment plate 62. This enhances mass-productivity of the opposing plate 64 and the attachment plate 62, thereby allowing costs to be reduced.

Each of the second reinforcement members 61 penetrates through the tank body 10 so as to pass between the pair of first reinforcement members 51 and spatially cross each of the first reinforcement members 51, that is, cross each of the first reinforcement members 51 with a distance in a direction perpendicular to each of the first direction and the second direction. The crossing angle in top plan view is about 90 degrees. When letting d1 be a distance between respective axes of the first reinforcement members 51 and d2 be a distance between respective axes of the second reinforcement members 61, provided is the relationship that d1>d2 (see FIGS. 5 and 6).

Next will be described a method of producing the tank Tf. The tank Tf can be produced, for example, by a method comprising: a main-assembly step of assembling a box-shaped tank body 10; a sub-assembly step of preliminarily assembling the first and second reinforcement assemblies 50 and 60, separately from the main-assembly step; an installation step of installing the first and second reinforcement assemblies 50 and 60 to the tank body 10.

In the main-assembly step, the L-shaped third plate 12 and the flat first plate 9 are welded to each other, and then the second plate 11 preliminarily subjected to bending is welded thereto. Thus formed is a rectangular parallelepiped-shaped tank body 10.

The sub-assembling step includes a first assembling step of assembling the first reinforcement assembly 50, and a second assembling step of assembling the second reinforcement assembly 60. In the first assembling step, the basal ends of the first reinforcement members 51 are fitted through the through-holes 52a in the ends of the attachment plate 52, respectively, for example, the attachment plate 52 being horizontally set on a working table, to be temporarily fixed. Then, the basal ends of the first reinforcement members 51 are welded to the attachment plate 52, thereby rigidly interconnecting the first reinforcement members 51 and the attachment plate 52 to form the first reinforcement assembly 50. Similarly, in the second assembling step, the basal ends of the second reinforcement members 61 are fitted into the through-holes 62a in the ends of the attachment plate 62, respectively, to be temporarily fixed. Then, the basal ends of the second reinforcement members 61 are welded to the attachment plate 62, thereby rigidly interconnecting the second reinforcement members 61 and the attachment plate 62 to form the second reinforcement assembly 60. The thus formed first and second reinforcement assemblies 50 and 60 are immersed for cleaning in order to remove welding residues adhered to weld zones thereof.

The installation step, which is intended to install the first and second reinforcement assemblies 50 and 60 each assembled in the sub-assembling step into the tank body 10 assembled in the main-assembly step, includes a temporary attachment step and a fixing step for each of the first and second reinforcement assemblies 50 and 60.

In the temporary attachment step for the first reinforcement assembly 50, the opposing plate 54 is welded to the left wall portion 15a of the tank body 10, and then the first reinforcement members 51 are inserted through the right fixing holes 22b of the right wall portion 15b, respectively, from the right side of the tank body 10. This insertion is continued until the contact of the attachment plate 52 joined to the basal ends of the first reinforcement members 51 with the outer surface of the right wall portion 15b. Thus completed is a temporary attachment of the first reinforcement assembly 50 to the tank body 10. In the fixing step for the first reinforcement assembly 50, the thus temporarily-attached first reinforcement assembly 50 is fixed to the tank body 10 by welding. Specifically, the attachment plate 52 of the first reinforcement assembly 50 is welded to the outer surface of the right wall portion 15b, and each of the distal ends of the first reinforcement members 51 is welded to the region around each of the through-holes 54a of the opposing plate 54, over the entire circumference of the distal end.

Likewise, in the temporary attachment step for the second reinforcement assembly 60, the opposing plate 64 is welded to the rear wall portion 14b of the tank body 10, and then the second reinforcement members 61 are inserted through the front fixing holes 21a of the front wall portion 14a, respectively, from the front side of the tank body 10. This insertion is continued until the contact of the attachment plate 62 joined to the basal ends of the second reinforcement members 61 with the outer surface of the front wall portion 14a. Thus completed is a temporary attachment of the second reinforcement assembly 60 to the tank body 10. In the fixing step for the second reinforcement assembly 60, the temporarily-attached second reinforcement assembly 60 is fixed to the tank body 10 by welding. Specifically, the attachment plate 62 of the second reinforcement assembly 60 is welded to the outer surface of the front wall portion 14a, and each of the distal ends of the second reinforcement members 61 is welded to the region around each of the through-holes 64a of the opposing plate 64, over the entire circumference of the distal end.

In the thus produced tank Tf, the first reinforcement members 51 are disposed across the left wall portion 15a and the right wall portion 15b, and the opposite ends of each of the first reinforcement members 51 are welded to the left wall portion 15a and the right wall portion 15b through the opposing plate and the attachment plate 52, respectively. Besides, the second reinforcement members 61 are disposed across the front wall portion 14a and the rear wall portion 14b, and the opposite ends of each of the second reinforcement members 61 are welded to the front wall portion 14a and the rear wall portion 14b through the attachment plate 62 and the opposing plate 64, respectively. This reinforcement structure, even in the case of a large fuel pressure acting on each of the inner surfaces of the front, rear, left and right wall portions 14a, 14b, 15a and 15b due to shaking during traveling of the shovel 100 or the like, enables the wall portions 14a, 14b, 15a and 15b to interact through the first and second reinforcement members 51 and 61 to suppress their deformations, thereby suppressing deformation of the tank body 10 to thus bring out high reinforcement effect. Furthermore, the cross of the first reinforcement members 51 extending in the right-left direction spatially and the second reinforcement members 61 extending in the front-rear direction, at an angle of about 90 degree, permits the reinforcing effect to be enhanced in all of the front, rear, right-left directions without concentrating in one direction. This enables the strength of the tank Tf to be significantly enhanced as compared to conventional tanks. Thus, the effective reinforcement of the tank Tf is established while minimizing an amount of the first and second reinforcement members 51 and 61 to be used, resulting in reduced cost for the reinforcement of the tank Tf.

Besides, because of no requirement of welding the first and second reinforcement members 51 and 61 to the inner surface of the tank over the entire longitudinal range thereof, differently from beam-like reinforcement members provided in the conventional tank, the welding of the first and second reinforcement members 51 and 61 can be finished within a short time. This reduces welding heat to be transferred to each of the wall portions 13a, 13b, 14a, 14b, 15a and 15b of the tank body 10, thereby enabling welding distortion and residual stress generated in the walls to be reduced. Furthermore no requirement of welding the first and second reinforcement members 51 and 61 to the inner surface of the tank body 10, as mentioned above, eliminates the possibility of an decrease in internal cleanness of the tank body 10 due to welding residues adhered to the inner surface of the tank body 10 or deterioration in exterior appearance of the tank body 10 due to embossment of a welding mark left in the inner surface of the tank body 10 onto the outer surface thereof.

Besides, the first and second attachment plates 52 and 62, fixed to respective basal ends of the first and second reinforcement members 51 and 61 in respective flange shapes to constitute the first and second reinforcement assemblies 50 and 60 respectively, can function as positioning means for the reinforcement members 51 and 61 in an axial direction (insertion direction), by their contact with the outer surface of the tank body 10 upon the insertion of the first and second reinforcement members 51 and 61 through the fixing holes 22a, 22b, 21a and 21b, respectively, thereby making it possible to reduce a time for installation of the reinforcement members 51 and 61 into the tank body 10. Besides, the first and second reinforcement assemblies 50 and 60 are immersible for cleaning, which can prevent welding residues due to the welding of the reinforcement members 51 and 61 and the attachment plates 52 and 62 from entering the inside of the tank body 10. This enables the internal cleanness of the tank body 10 to be enhanced.

Moreover, in the above embodiment, the distance d1 between the first reinforcement members 51 of the first reinforcement assembly 50 greater than the distance d2 between the second reinforcement members 61 of the second reinforcement assembly 60 enables the revel of the reinforcement between the left and right wall portions 15a and 15d to which an especially internal large load due to the fuel pressure within the tank body 10 is applied to be larger than the revel of the reinforcement between the front and rear wall portions 14a and 14d. This means the possibility of well-balanced reinforcement suited to an actual load to be applied to the tank body 10.

Besides, each of the attachment plates 52 and 62 and the opposing plates 54 and 64 is also permitted to function as a reinforcement member, by superimposing and welding them to the outer surface of the tank body 10, thus compensating for deterioration in strength of the wall portions 13a, 13b, 14a, 14b, 15a and 15b due to formation of the fixing holes 21a, 21b, 22a and 22b.

The present invention further includes, for example, the following modified embodiments.

FIGS. 7A and 7B show a tank Tf1 according to a first modified embodiment. This tank Tf1 is different from the tank Tf according to the above embodiment in shape of the first reinforcement member 51. In the following modified embodiments and other embodiments, substantially the same element or component as that in FIGS. 5 and 6 is assigned with the same reference numeral or code, and detailed description thereof will be appropriately omitted.

In the first modified embodiment, each first reinforcement member 51 has bends which incline an intermediate portion of the first reinforcement member 51 upwardly in a direction from right toward left. The right wall portion 15b has a pair of right fixing holes 22b, each of which is formed into a vertical elongate hole to allow the first reinforcement member 51 with the bends to be inserted therethrough.

The bends of the first reinforcement member 51 permits the first reinforcement member 51 to efficiently absorb deformation of the left and light wall portions 15a and 15b which undergo a great internal load as compared to the front and rear wall portions 14a and 14b, thereby preventing excessive stress concentration from occurring in a portion interconnecting the first reinforcement member 51 and each of the left and light wall portions 15a and 15b.

FIGS. 8A and 8B show a tank Tf2 according to a second modified embodiment. This tank Tf2 is different from respective tanks according to the above embodiment and the first modified embodiment in respective structures of the first reinforcement member 51 and the second reinforcement member 61. Specifically, in the second modified embodiment, each of the opposite ends of the upper first reinforcement member 51 and the opposite ends of the upper second reinforcement member 61 is formed with a screw hole 70 for attaching a hanging member 101 thereto, the screw hole 70 being opened outwardly in the axial direction of each of the reinforcement members 51 and 61. The hanging member 101 may be an I-bolt as shown in FIGS. 8A and 8B, or may be a hook member. The hanging members 101 thus attached to the opposite ends of the first and second reinforcement members 51 and 61 respectively enables the tank Tf2 to be stably hung up at a plurality of positions (in the shown embodiment, total four positions) by use of a hoist crane or the like. Furthermore, differently from the case of welding a nut for the attachment of the I-bolt to the tank body 10, the exterior appearance of the tank body 10 is prevented from deterioration. The screw hole 70 alternatively can be formed only in each of the ends of one of the first reinforcement member 51 and the second reinforcement member 61, for example, of the first reinforcement member 51.

The present invention is not limited to the above embodiment and modified embodiments, but may include various other configurations.

For example, while, in the above embodiment and modified embodiments, the reinforcement members 51 and 61 are welded to respective wall portions of the rank body 10 through the attachment plates 52 and 62 and the opposing plate 54 and 64, respectively, the attachment plates 52 and 62 and the opposing plates 54 and 64 can be omitted while each of the reinforcement members 51 and 61 being welded to the wall portions of the rank body 10. Besides, the reinforcement members 51 and 61 and the attachment plate 52 and 62 may be interconnected respectively by means other than welding, for example, by means of fastener such as a bolt.

The present invention may be applied to any type of tank other than the fuel tank, for example, a hydraulic fluid tank Th.

In the present invention, each of the first reinforcement member 51 and the second reinforcement member 61 is also not limited to a specific shape or a specific structure. Each of the reinforcement members 51 and 61 may be a solid rod-shaped member or may be a hollow rod-shaped member. Each of the reinforcement members 51 and 61 may have any cross-sectional shape other than a circular shape in the shown embodiment, such as a triangular shape or a rectangular shape. The number of the first reinforcement members 51 or the number of the second reinforcement members 61 is not limited to two, but may be one, or three or more. Furthermore, the number of the first reinforcement members 51 and the number of the second reinforcement members 61 do not have to be equal to each other. In the case where the greater number of the first reinforcement members 51 is greater than the number of the second reinforcement members 61, for example, in the case where the number of the first reinforcement members 51 is three while the number of the second reinforcement members 61 is two, it is possible to enhance the reinforcing effect in the right-left direction of the tank along which higher strength is required than that along to the front-rear direction of the tank.

In the present invention, the tank body 10 is not limited to the shown rectangular box shape, but may be formed in a shape as that of a tank Tf3 according to a third modified embodiment shown in FIG. 9, namely, a shape having an L-shaped cross section in lateral view.

Furthermore, the present invention permits any combination among the above embodiment and the modified embodiments.

As mentioned above, the present invention provides a tank to be provided in a construction machine, the tank having enhanced rigidity with a low-cost structure and an excellent assembly performance without remarked reduction in internal cleanness. Specifically, provided is a tank which comprises a tank body, at least one first reinforcement member, and at least one second reinforcement member, the tank body including: a first wall portion; a first opposing wall portion opposing to the first wall portion in a first direction; a second wall portion lying between the first wall portion and the first opposing wall portion; and a second opposing wall portion lying between the first wall portion and the first opposing wall portion and opposing to the second wall portion in a second direction crossing the first direction. The at least one first reinforcement member is disposed across the first wall portion and the first opposing wall portion and has opposite ends welded to the first wall portion and the first opposing wall portion, respectively. The at least one second reinforcement member is disposed across the second wall portion and the second opposing wall portion while spatially crossing the at least one first reinforcement member, that is, crossing the at least one first reinforcement member with a distance in a direction perpendicular to either of the first and second directions, and has opposite ends welded to the second wall portion and the second opposing wall portion, respectively.

This tank according to the present invention can exert an enhanced reinforcement effect as compared to a structure in which a reinforce member is simply welded to an inner surface of the wall, because, even when a large load is applied to each wall of the tank body from an inside of the tank body, a pair of the wall portions opposing to each other interact through the first and second reinforcement members to suppress their respective deformations. In addition, the spatial cross of the first and second reinforcement members each interconnecting the pair of the walls opposing to each other permits the reinforcement effect to be enhanced without concentrating in one direction but in at least two directions. Effective reinforcement of the tank is thus realized by use of only a few of reinforcement members (first and second reinforcement members) and thereby the cost for reinforcement can be suppressed.

Furthermore, since each of the first and second reinforcement members has to be welded only in the opposite ends thereof to the walls of the tank, the required time for welding them is shortened as compared to the case of welding the entire reinforcement member to an inner surface of the wall of the tank body; this reduces welding heat to be transferred to the wall, thus suppressing welding distortion and residual stress which could be generated in each wall. Besides, there is no risk of an adherence of welding residues due to the welding to the inner surface of the tank body, which allows the internal cleanness of the tank to be enhanced. Moreover, differently from the case of welding a reinforcement member to the inner surface of the wall, it is prevented that a weld mark left in the inner surface of the tank embosses onto an outer surface of the tank to deteriorate the exterior appearance of the tank.

As to a specific structure for fixing each of the first and second reinforcement members, it is preferable that: the tank of the present invention further comprises a first attachment plate fixed to a basal end of the at least one first reinforcement member in a flange shape and a second attachment plate fixed to a basal end of the at least one first reinforcement member in a flange shape, the at least one first reinforcement member and the first attachment plate constituting a first reinforcement assembly, the at least one second reinforcement member and the second attachment plate constituting a second reinforcement assembly; each of the first wall portion and the first opposing wall portion is formed with a first fixing hole through which the at least one first reinforcement member is inserted; and each of the second wall and the second opposing wall portion is formed with a second fixing hole through which the at least one second reinforcement member is inserted; the first reinforcement assembly is fixed to the tank body with the insertion of the at least one first reinforcement member through the first fixing holes of the first wall portion and the first opposing wall portion, the first attachment plate being welded to an outer surface of the first wall portion, the distal end of the at least one first reinforcement member being welded to the first opposing wall portion; and the second reinforcement assembly is fixed to the tank body with the insertion of the at least one second reinforcement member through the second fixing hole of the second wall and the second opposing wall portion, the second attachment plate being welded to an outer surface of the second wall portion, the distal end of the at least one second reinforcement member being welded to the second opposing wall portion.

According to this tank, the insertion of each of the first or second reinforcement member into the fixing holes will bring the attachment plate into contact with an outer surface of the tank body, thus causing the attachment plate to function as means for positioning the inserted reinforcement member in an axial direction, that is, insertion direction. This can reduce the time required for the operation of positioning the reinforcement members and, as a result, the time required for installation of the reinforcement members into the tank body. Besides, the attachment plates joined to the first and second walls can effectively reinforce the region around the fixing holes in each of the wall portions, the region being particularly likely to loose high strength.

Furthermore, sub-assembling the first and second reinforcement members with the first and second attachment plates into the first and second reinforcement assemblies respectively allows the time required for installation of the reinforcement members to the tank to be reduced as compared with the case of installing the first or second reinforcement member and the first or second attachment plate to the tank separately. Besides, the first and second reinforcement assemblies can be immersed for their cleaning, which makes it possible, for example, to prevent welding residues caused by welding each of the reinforcement members to the attachment plate from entering the inside of the tank, thereby enhancing the internal cleanness of the tank.

In the case of the tank including the first and second reinforcement assemblies, it is more preferable that the tank further comprises a first opposing plate opposing the first attachment plate and being welded to the first opposing wall portion at a position around the first fixing hole thereof and a second opposing plate opposing the second attachment plate and being welded to the second opposing wall portion at a position around the second fixing hole thereof, the first and second opposing plates being formed with respective through-holes in respective areas corresponding to the first fixing hole of the first opposing wall portion and the second fixing hole of the first opposing wall portion, wherein the distal end of the first reinforcement member of the first reinforcement assembly fixed to the tank body is inserted through the through-hole of the first opposing plate joined to the first opposing wall portion and welded to the first opposing plate, and the distal end of the second reinforcement member of the second reinforcement assembly fixed to the tank body is inserted through the through-hole of the second opposing plate joined to the second opposing wall portion and welded to the second opposing plate. According to this tank, the first and second opposing plate can effectively reinforce respective regions around the fixing holes of the first and second opposing wall portions respectively, thus further enhancing the strength of the tank.

The first reinforcement assembly preferably includes a plurality of first reinforcement members as the at least one first reinforcement member, the plurality of reinforcement members being arranged so as to extend parallel to each other and having respective basal ends which are fixed to the first attachment plate to be interconnected through the first attachment plate. Likewise, the second reinforcement assembly preferably includes a plurality of second reinforcement members as the at least one second reinforcement member, the plurality of second reinforcement members being arranged so as to extend parallel to each other and having respective basal ends which are fixed to the second attachment plate to be interconnected through the second attachment plate. Each of the first and second reinforcement assembly, including the plurality of the first or second reinforcement members, can exert an improved reinforcing effect, while interjoining the first or second reinforcement members by utilization of the first or second attachment plate, that is, sub-assembling the first or second reinforcement members ensures the first or second reinforcement members to be easily installed to the tank.

In addition, the plurality of first reinforcement members or the plurality of second reinforcement members are aligned in a direction different from either of the first direction and the second direction. This arrangement allows the reinforcing effect to be equalized among directions.

In the case where the first wall portion has an inner surface area greater than that of the second wall portion, that is, in the case where the first wall portion undergoes a greater load due to fluid pressure in the tank from the inside of the tank than a load which the second wall undergoes from the inside of the tank, it is preferable that: the first reinforcement assembly includes a plurality of first reinforcement members as the at least one first reinforcement member, the plurality of first reinforcement members being arranged so as to extend parallel to each other; the second reinforcement assembly includes a plurality of second reinforcement members as the at least one second reinforcement member, the plurality of second reinforcement members being arranged so as to extend parallel to each other; and a distance between the first reinforcement members is greater than that between the second reinforcement members. This arrangement allows a level of the reinforcement between the first wall portion and the first opposing wall portion to which a large load can be applied as mentioned above to be set larger than a level of the reinforcement between the second wall and the second opposing wall portion. There is thus allowed a well-balanced reinforcement suited to an actual load to be applied to the tank body.

In the tank of the present invention, each of the ends of the at least one first reinforcement member is preferably formed with a screw hole for attaching a hanging member thereto. The screw hole allows the first reinforcement member to be additionally utilized as a portion to which the hanging member can be attached, thereby reducing the number of components of the tank and suppressing cost for reinforcement at low level. Furthermore, differently from the case of welding a nut for attaching the hanging member to an outer surface of the wall of the tank body, the exterior appearance of the tank body is prevented from being deteriorated.

This application is based on Japanese Patent application No. 2011-216498 filed in Japan Patent Office on Sep. 30, 2011, the contents of which are hereby incorporated by reference.

Although the present invention has been fully described by way of example with reference to the accompanying drawings, it is to be understood that various changes and modifications will be apparent to those skilled in the art. Therefore, unless otherwise such changes and modifications depart from the scope of the present invention hereinafter defined, they should be construed as being included therein.

What is claimed is:

1. A tank to be provided in a construction machine, comprising:
    a tank body having a first wall portion, a first opposing wall portion opposing to the first wall portion in a first direction, a second wall lying between the first wall portion and the first opposing wall portion, and a second opposing wall portion lying between the first wall portion and the first opposing wall portion and opposing to the second wall in a second direction crossing the first direction;
    at least one first reinforcement member disposed across the first wall portion and the first opposing wall portion, the at least one first reinforcement member having opposite ends welded to the first wall portion and the first opposing wall portion, respectively;
    at least one second reinforcement member disposed across the second wall and the second opposing wall portion while spatially crossing the at least one first reinforcement member, the at least one second reinforcement member having opposite ends welded to the second wall and the second opposing wall portion, respectively; and
    a first attachment plate fixed to a basal end of the at least one first reinforcement member in a flange shape and a second attachment plate fixed to a basal end of the at least one second reinforcement member in a flange shape, and wherein:
    the at least one first reinforcement member and the first attachment plate constitute a first reinforcement assembly;
    the at least one second reinforcement member and the second attachment plate constitute a second reinforcement assembly;
    each of the first wall portion and the first opposing wall portion is formed with a first fixing hole through which the at least one first reinforcement member is inserted;
    each of the second wall and the second opposing wall portion is formed with a second fixing hole through which the at least one second reinforcement member is inserted;
    the first reinforcement assembly is fixed to the tank body with the insertion of the at least one first reinforcement member through the first fixing holes of the first wall portion and the first opposing wall portion, the first attachment plate being welded to an outer surface of the first wall portion, the distal end of the at least one first reinforcement member being welded to the first opposing wall portion; and
    the second reinforcement assembly is fixed to the tank body with the insertion of the at least one second reinforcement member through the second fixing hole of the second wall and the second opposing wall portion, the second attachment plate being welded to an outer surface of the second wall portion, the distal end of the at least one second reinforcement member being welded to the second opposing wall portion.

2. The tank as defined in claim 1, which further comprises a first opposing plate opposing the first attachment plate and being welded to the first opposing wall portion in a position around the first fixing hole thereof and a second opposing plate opposing the second attachment plate and being welded to the second opposing wall portion in a position around the second fixing hole thereof, the first and second opposing plates being formed with respective through-holes in respective areas corresponding to the first fixing hole of the first opposing wall portion and the second fixing hole of the second opposing wall portion, wherein the distal end of the at least one first reinforcement member of the first reinforcement assembly fixed to the tank body is inserted through the through-hole of the first opposing plate joined to the first opposing wall portion and welded to the first opposing plate, and the distal end of the at least one second reinforcement member of the second reinforcement assembly fixed to the tank body is inserted through the through-hole of the second opposing plate joined to the second opposing wall portion and welded to the second opposing plate.

3. The tank as defined in claim 1, wherein the first reinforcement assembly includes a plurality of first reinforcement members as the at least one first reinforcement member, the plurality of first reinforcement members being arranged so as to extend parallel to each other and having respective basal ends which are fixed to the first attachment plate to be interconnected through the first attachment plate.

4. The tank as defined in claim 3, wherein the plurality of first reinforcement members are aligned in a direction different from either of the first direction and the second direction.

5. The tank as defined in claim 1, wherein the second reinforcement assembly includes a plurality of second reinforcement members as the at least one second reinforcement member, the plurality of second reinforcement members being arranged so as to extend parallel to each other and having respective basal ends which are fixed to the second attachment plate to be interconnected through the second attachment plate.

6. The tank as defined in claim 5, wherein the plurality of second reinforcement members are aligned in a direction different from either of the first direction and the second direction.

7. The tank as defined in claim 1, wherein:
    the first wall portion has an inner surface area greater than an inner surface area of the second wall;
    the first reinforcement assembly includes a plurality of first reinforcement members as the at least one first reinforcement member, the plurality of first reinforcement members being arranged so as to extend parallel to each other; and
    the second reinforcement assembly includes a plurality of second reinforcement members as the at least one second reinforcement member, the plurality of second reinforcement members being arranged so as to extend parallel to each other; and
    a distance between the first reinforcement members is greater than a distance between the second reinforcement members.

8. A tank to be provided in a construction machine, comprising:
    a tank body having a first wall portion, a first opposing wall portion opposing to the first wall portion in a first direction, a second wall lying between the first wall portion and the first opposing wall portion, and a second opposing wall portion lying between the first wall portion and the first opposing wall portion and opposing to the second wall in a second direction crossing the first direction;

at least one first reinforcement member disposed across the first wall portion and the first opposing wall portion, the at least one first reinforcement member having opposite ends welded to the first wall portion and the first opposing wall portion, respectively; and at least one second reinforcement member disposed across the second wall and the second opposing wall portion while spatially crossing the at least one first reinforcement member, the at least one second reinforcement member having opposite ends welded to the second wall and the second opposing wall portion, respectively, wherein each of the ends of the at least one first reinforcement member is formed with a screw hole for attaching a hanging member thereto.

\* \* \* \* \*